P. A. FISCHER.
CANOPIED AUTOMOBILE DOOR.
APPLICATION FILED OCT. 19, 1920.
1,425,954.
Patented Aug. 15, 1922.
2 SHEETS—SHEET 1.
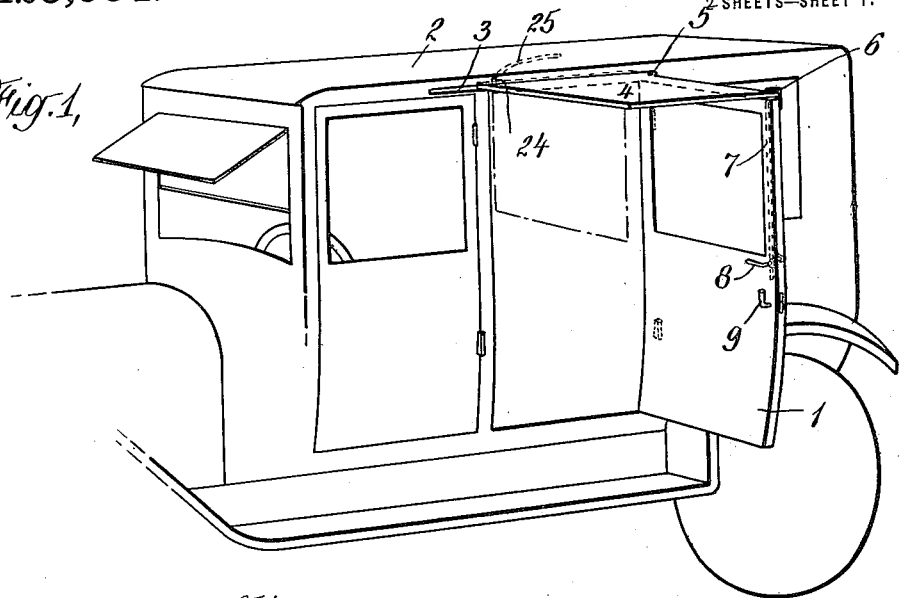
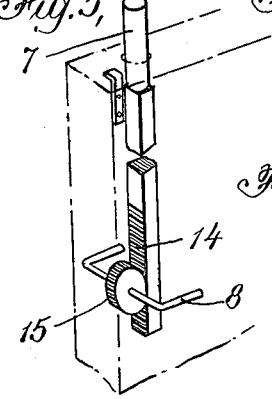
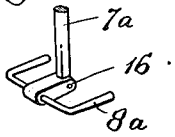
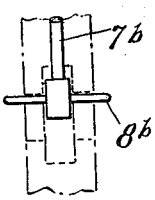
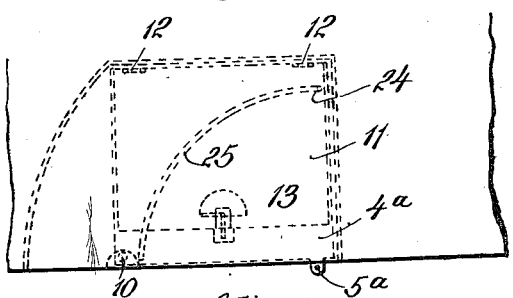
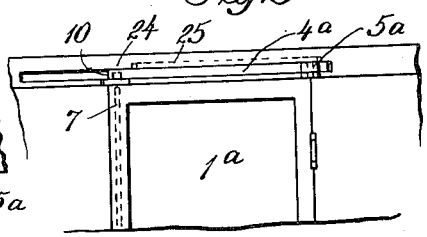
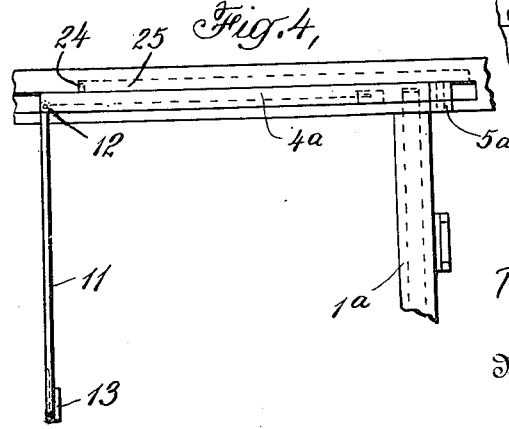
Philip A. Fischer, Inventor
By his Attorneys
Pennie Davis Marvin Edmonds

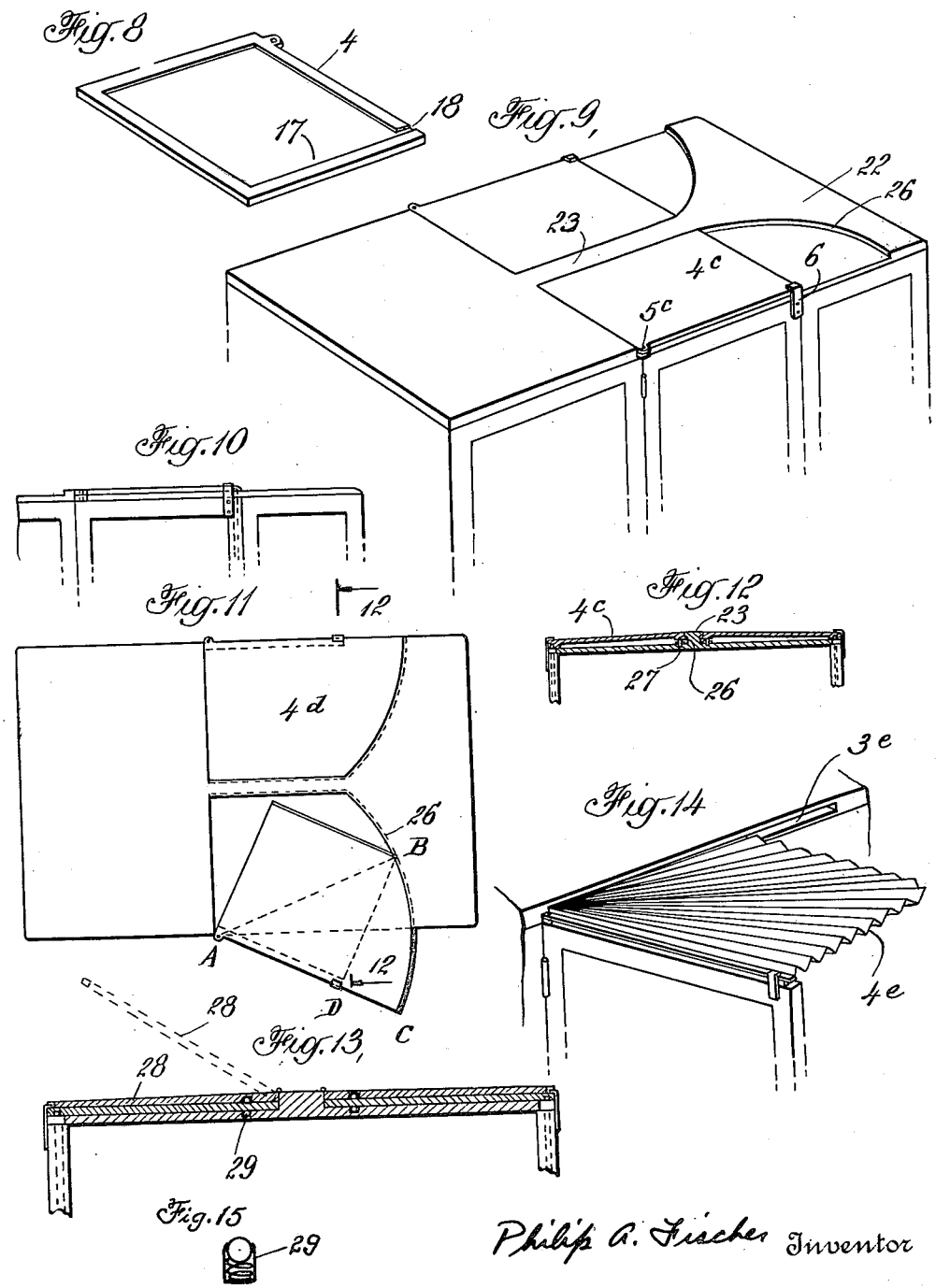

UNITED STATES PATENT OFFICE.

PHILIP A. FISCHER, OF NEW YORK, N. Y.

CANOPIED AUTOMOBILE DOOR.

1,425,954.  Specification of Letters Patent.  Patented Aug. 15, 1922.

Application filed October 19, 1920. Serial No. 417,896.

*To all whom it may concern:*

Be it known that I, PHILIP A. FISCHER, a citizen of the United States, residing at 409 Edgecombe Avenue, New York, N. Y., in the county of New York, city and State of New York, have invented certain new and useful Improvements in Canopied Automobile Doors; and I do hereby declare the following to be a full, clear, and exact description of the invention, such as will enable others skilled in the art to which it appertains to make and use the same.

This invention relates to improvements in canopied automobile doors or in canopies for automobiles adapted to be actuated by the door and to protect the passenger when entering and leaving the automobile.

When an automobile is used in pleasant weather the occupant or passenger requires no protection when entering and leaving the automobile. In stormy weather, however, when the occupant enters or leaves the automobile, it is of importance to give protection against the elements. It is also of importance, in providing such protection, to provide protecting means which are available when needed but which is capable of being left unused at other times without interfering with the opening and closing of the automobile doors.

According to the present invention, I provide such a canopy or attachment which is available for use when needed and which does not interfere in any way with the free use of the automobile and the opening and closing of the automobile doors at other times. I provide a canopy which is secured to or forms a part of the top or roof of the automobile and which is pivoted and adapted to be connected to or operated by the automobile door so that, when the automobile door is opened, the canopy will be swung around into a position to give protection from above, and will be swung back when the door is closed. I also provide for connecting or disconnecting the door with the canopy so that the door can be freely opened or closed without moving the canopy, or so that the door and canopy may be opened and closed together.

My invention may be embodied in automobiles or automobile tops at the time of their manufacture, or it can be embodied in or applied to an automobile previously made. The canopy can thus be provided as an attachment which can be secured to or combined with the top of an automobile, particularly automobiles which have a flat or slightly curved metal or wooden top, by securing the canopy beneath the top or between the top and upholstery, or by applying it on top of the automobile roof. Similarly, when the canopy is built into the automobile at the time it is made, the top of the automobile may be suitably modified to provide room for the canopy, or the canopy can be otherwise applied in any suitable manner.

In the preferred embodiment of the invention, I provide a canopy in the form of a pivoted member, made in one piece, or made of frame work with suitable covering material, which is pivoted to the automobile at one corner, corresponding to the hinge of the automobile door, and arranged so that it will open when the automobile door is opened and be closed therewith. The canopy or top may be made of different material, such as metal, wood, etc., or of a suitable metal or wooden frame covered with waterproof material. The canopy can further be provided with a drip guard to prevent water from dripping from the front edge. The canopy can also be made of varying shapes, such as rectangular, square, trapezoidal, or with combinations of straight and curved edges which will best adapt it to the needs of the particular automobile or automobile top with which it is combined or used. The canopy may also have a separate pocket in the roof of the automobile, or above or below the roof, by which it is held and from which it is withdrawn when desired. Such a pocket should be waterproof to prevent drip from the wet canopy entering the car.

Whatever the shape or form or construction of the canopy, and whether it is above or below the main roof of the automobile, I provide means on the automobile door for connecting the canopy therewith when desired, and for disconnecting the canopy at other times. Various kinds of connecting means may be used for this purpose, but it is of advantage to have means on the automobile door that can be operated equally well from within or without in much the same manner that the door handle itself is operated, so that the occupant can connect the canopy with the door and open the two together in a simple and convenient manner.

The invention will be further illustrated and described in connection with the embodiment thereof shown in the accompanying drawings, but it is intended and will be understood that the invention is illustrated by, but is not limited to, the specific embodiments so illustrated and described.

In the accompanying drawings, Fig. 1 shows in a somewhat conventional and diagrammatic manner, an automobile having the invention embodied therein; Fig. 2 is a top view of part of an automobile with a somewhat modified form of canopy combined therewith; Fig. 3 is a side view of the construction of Fig. 2; Fig. 4 is a somewhat enlarged view of the construction of Figs. 2 and 3 with the door and canopy open; Fig. 5 is an enlarged view showing one form of operating device for connecting the door and canopy; Figs. 6 and 7 show modified forms of operating devices; Fig. 8 shows a preferred form of canopy separated from the automobile; Fig. 9 shows the invention applied to the top of a car roof; Figs. 10 and 11 show modified forms of the invention as applied to the top of a car roof; Fig. 12 shows a sectional view taken on line 12—12 of Fig. 11 showing anti-friction means supporting the canopy; Fig. 13 shows a modified construction of the car roof whereby easy access to the canopy may be had; Fig. 14 shows a modified form of canopy, and Fig. 15 is a detail view of an anti-rattling device.

In the construction illustrated in Fig. 1, the automobile door 1 is arranged to be opened and closed in the usual way. The roof 2 has a pocket 3 therein, or arranged below the top thereof, and the top or canopy 4, which is pivoted at 5, is arranged in this pocket so that it can be withdrawn and returned. The automobile door 1 has a rod 7 operated by a handle 8 and arranged to engage a suitable recess in one corner of the sliding canopy 4, so that, when so engaged, the canopy will be opened and closed with the door. A stop 6 is provided for preventing the canopy from remaining open when the door is being closed, or from being accidentally opened while the door is closed. This stop also assists in the closing of the canopy with the door should the rod 7 become disengaged. This stop is preferably made angle-shaped (as shown most clearly in Fig. 9) to prevent the canopy from slipping off vertically should it be hit by an occupant's head when entering or alighting. The canopy 4 is also provided with suitable means such as a pin 24 sliding in a groove 25 in the car roof or the pocket for preventing it from being completely withdrawn from the slot or pocket 3, thereby also preventing the door from being opened too far.

In the operation of the invention, as illustrated in Fig. 1, the door will ordinarily be opened and closed by the usual handle 9. If the canopy is not to be used, the rod 7 will remain disengaged and the door will then freely open and close while the canopy will remain hidden. If the canopy is to be opened with the door, the rod 7 is moved into engagement with the canopy by means of the handle 8 and the opening of the door will then simultaneously open the canopy. The occupant of the automobile can then step out onto the step of the automibile and he will be protected from above by the canopy. When the door is closed, the canopy will simultaneously be closed by the stop 6, even though the rod 7 has been released from engagement therewith.

In the modified construction of Figs. 2, 3 and 4 the canopy $4^a$ is pivoted at $5^a$ and is adapted to be opened and closed with the door $1^a$ in much the same manner as in the construction of Fig. 1. The canopy $4^a$, however, has a folding part 11 hinged at 12 and secured in place by a catch 13 when folded. By releasing the catch 13 the part 11 drops and serves as a further protection. That is, when the door is opened and the canopy is also opened, as in Fig. 4, the catch 13 can be released, and this will permit the folding part 11 to drop into the position shown in Fig. 4. The construction and arrangement of this part 11 is such that it need not be used, and the canopy can be opened and closed without using it, since the catch 13 will hold the folding part in raised position unless released. When released by the catch 13, the folding part swings down on the hinges 12 and hangs vertically, thus affording protection on the opposite side of the canopy to the door. Thus, from Fig. 4 it will be seen that the door is at the right of the figure and the folding part 11 is at the left, so that a person entering or leaving the automobile will be protected by the door on one side and by the folding part 11 on the other, as well as by the canopy itself, which will give protection from above.

In Figs. 5, 6 and 7, there are illustrated different forms of operating means for connecting the door with the canopy when both are to be opened and closed together. In Fig. 5 the rod 7 is moved by the handle 8 through a pinion 15 and co-acting gear 14. In Fig. 6, the rod $7^a$ is pivoted at 16 to an extension carried by the handle $8^a$. In Fig. 7 the rod $7^b$ is adapted to be moved by means of the projecting handle $8^b$. In these and similar constructions of operating devices, the occupant of the car can readily move the rod 7 into engagement with the canopy when the door is closed, so that, when the door is opened, the canopy will be opened at the same time.

In order to protect the user of the automobile from water dripping from the edge of the canopy, the edge may be provided with a drip guard, for example, as illustrated in Fig. 8 at 17, with the outlet 18 at one side.

Where it is desired to embody the invention in a taxi-cab, for example, without any considerable expense, this may be done by applying the canopy to the top of the roof of the automobile, for example, as illustrated in Figs. 9 to 12. In the construction of Figs. 9, 11 and 12, the canopy $4^c$ is pivoted at $5^c$ and is arranged to slide on top of the car. In order to hold the canopy in place when the door is closed, a raised portion 22 may be provided having a portion 23 extending between the canopies on opposite sides and holding them in place. The shape of the cutaway portion may also be such as to provide a guide groove 26 for the canopy when it is being opened and closed. This canopy will be operated in much the same manner described above.

In the construction of Fig. 10, the raised portion 22 of Fig. 9 has been omitted. By applying the canopy to the top of the roof of the automobile, it is not necessary to make any change in the interior of the automobile, and the slight additional thickness of the top due to the canopy does not interfere with the appearance or lines of the top of the automobile.

Ordinarily, the canopy will not have a width greater than half the width of the automobile, so that, as illustrated in Fig. 9, the two canopies on opposite sides of the car will not overlap. It is not essential, however, that the canopy should be so limited in size, and it will be evident that canopies of different size and shape and construction can be used in a similar manner. In one direction, the canopy should be as wide as the door, if not wider, depending on whether it is to project only as far as the door, or still farther.

For example, the canopies $4^d$ shown in Fig. 11 are substantially trapezoidal in shape, the inclined edge, however, being the arc of a circle. The radius of curvature of the groove 26 must be equal to the greatest diagonal of the canopy (if rectangular). This radius is indicated in Fig. 11 by broken line A B. By making the outer edge of the canopy A C equal in length to A B and cutting edge B C on the arc of a circle, the area of the canopy is increased by a segmental-shaped section BCD which not only adds to the effectiveness of the canopy but fills an unused space in the pocket when the canopy is closed.

Fig. 13 shows the pocket with a hinged top portion 28 which may be easily raised like an engine hood to permit access to the pocket. If the canopy should become damaged when open in such a manner as to prevent its being reinserted into the pocket, it might become necessary to drive through the streets with the canopy projecting outwardly. If the pocket were equipped with a hinged or movable side, this possibility could not arise. Similarly should the canopy become jammed in its closed position the trouble could be easily adjusted after opening section 28 without any necessity for injuring the car roof.

It will be evident that suitable guides can be provided for guiding the canopy while it is being opened and closed, and that ball bearings or rollers or other friction reducing means, such as rollers 27, Fig. 12, can be provided for reducing friction in the opening and closing of the canopy. So also, springs or spring devices, such as those illustrated at 29 in Fig. 15, or other means can be provided for holding the canopy so that it will not rattle or become accidentally opened. Thus, where the canopy is placed in a pocket made in the roof of the automobile, or where a separate pocket is provided for the canopy and secured to the automobile top, such pocket may be provided with means for reducing friction when the canopy is opened and closed as well as means for holding the canopy from becoming accidentally opened and from rattling.

Although a sliding canopy has been illustrated and described as the preferred form it is clear that other forms might be employed. One such other form is shown in Fig. 14. The canopy there illustrated consists of a folding, fan-like member $4^e$ which extends when the door is opened and folds into a small slot $3^e$ in the car roof when the door is closed. A rolling canopy might also be used.

From the foregoing description it will be seen that the present invention provided a door-operated canopy which may be canceled or partially concealed or even exposed, and which can be connected with the door so that it will be opened and closed therewith, or left closed when desired. Variations and modifications can be made in the specific construction of the canopy or in the material or materials of which it is made, as well as in the means for connecting it with the door, for example, to adapt it for different makes or shapes of automobiles, etc., without departing from the spirit and the scope of the invention.

I claim:

1. A canopy for automobiles comprising a canopy member arranged to be opened and closed by the automobile door, means for connecting and disconnecting the canopy member and door, whereby the door can be opened with the canopy or independently thereof and means arranged at a distance below the canopy for operating said connecting and disconnecting means.

2. A canopy for automobiles comprising a canopy member secured to the automobile top, a pocket in the automobile top into which the canopy is moved when not in use, one side of said pocket being provided with anti-friction and anti-rattling devices and arranged to be moved to a position to permit access to the pocket and canopy contained therein and to relieve the canopy of pressure applied by the anti-friction and anti-rattling devices.

3. A canopy for automobiles pivotally secured to the automobile top and adapted to be engaged by an operating rod, an operating rod carried by the automobile door, and a handle arranged to move the operating rod into engagement with the canopy, whereby the canopy can be opened and closed with the door.

4. A canopy for automobiles comprising a canopy member secured to the automobile top, means for connecting and disconnecting the automobile door and canopy to effect opening of the door and canopy simultaneously or permit opening of the door independently, and means carried by the door for insuring closing of the canopy with the door when disconnected.

5. A canopy for automobiles comprising a canopy member pivotally secured to the automobile top at a point corresponding to the hinge of the automobile door, an operating rod carried by the automobile door for connecting and disconnnecting the door and canopy, and a handle arranged on both sides of the door for moving the operating rod into engagement or disengagement with the canopy, whereby the canopy can be opened and closed simultaneously with the door or the door independently operated, and means carried by the door for insuring the closing of the canopy with the door when the said operating rod is not in engagement with the canopy.

6. A canopy for automobiles carried by the automobile top and a folding section, hinged to the canopy on one side and adapted to fold down when the canopy is open, to a vertical position on the opposite side of the canopy to the door.

7. A canopy for automobiles comprising a canopy member carried by the automobile top, means for connecting and disconnecting the canopy member and the door of the automobile, and means concealed within the door frame for operating said connecting and disconnecting means.

8. A canopy for automobiles secured to the automobile top adjacent to the automobile door, a pocket in the automobile top in which the canopy is normally retained, and combined anti-friction and anti-rattling devices arranged to contact with the upper and lower surfaces of the canopy for preventing friction between the canopy and the walls of the pocket and for preventing rattling of the canopy when retained within the pocket.

In testimony whereof I affix my signature.

PHILIP A. FISCHER.